Figure 3:
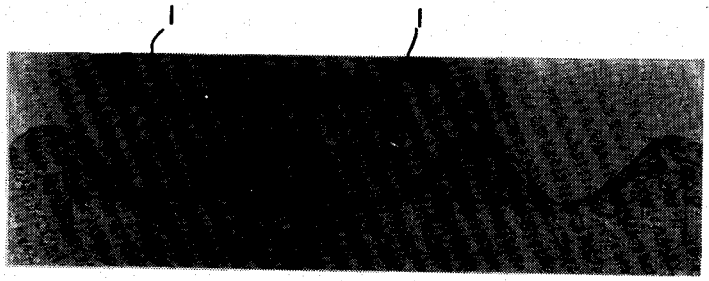

Jan. 23, 1968     J. BARRINGTON     3,364,561
EXPLOSIVE TUBE BONDING
Filed Feb. 10, 1966     2 Sheets-Sheet 1
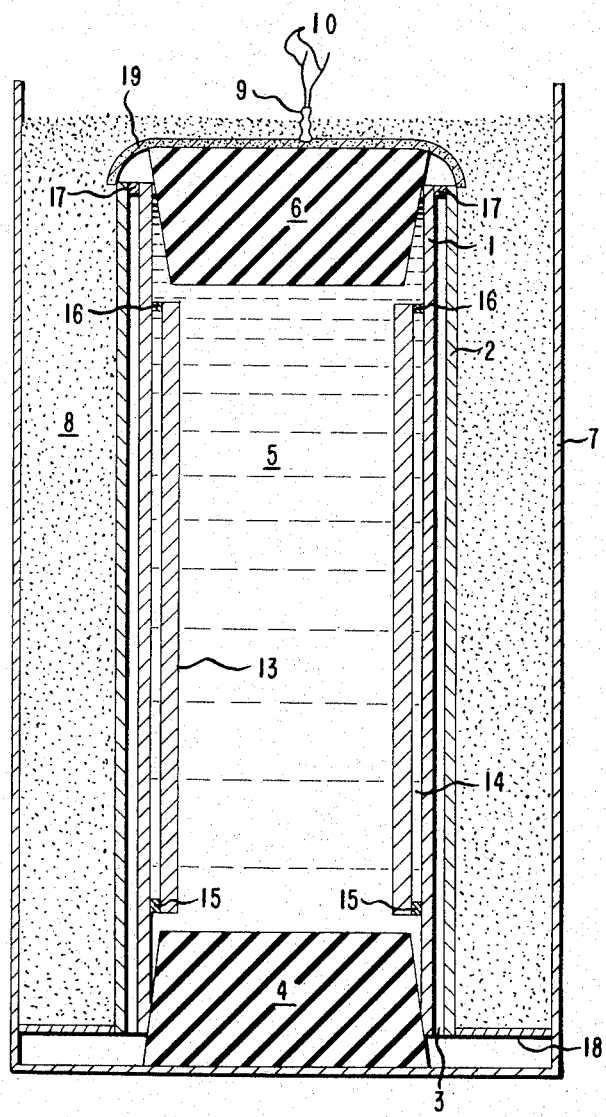
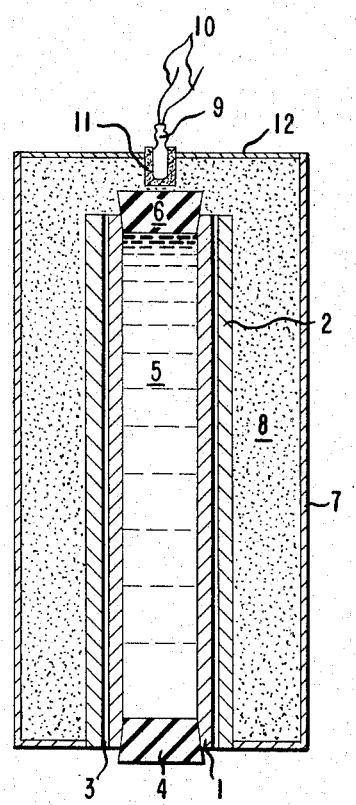
INVENTOR
JONATHAN BARRINGTON
BY
ATTORNEY Jan. 23, 1968  J. BARRINGTON  3,364,561
EXPLOSIVE TUBE BONDING Filed Feb. 10, 1966  2 Sheets-Sheet 2

INVENTOR
JONATHAN BARRINGTON

BY
ATTORNEY

__United States Patent Office__  3,364,561
Patented Jan. 23, 1968

3,364,561
EXPLOSIVE TUBE BONDING
Jonathan Barrington, Malvern, Pa., assignor to E. I. du Pont de Nemours and Company, Wilmington, Del., a corporation of Delaware
Filed Feb. 10, 1966, Ser. No. 526,488
8 Claims. (Cl. 29—470.1)

The present invention relates to a process, and more particularly to a process for producing a metallurgical bond between adjacent surfaces of coaxial metal tubes using explosives.

Polymetallic tubes, i.e., laminated tubes wherein individual layers are formed from different metals, are widely needed in industry. Many situations exist in which the property requirements for a metal on the inside portion of a tube differ markedly from those for the metal on the outside portion, e.g., when the tube is used to transport chemicals, or when it contains a coolant liquid and is immersed in a chemical reaction system to act as a heat exchanger. In such cases, use of a monometallic (i.e., monolayered) body often imposes an economic penalty since resistance to the more severe environment is apt to be found only in more expensive metals and a cheaper metal often is adequate for the portion of the body exposed to a less severe environment. The use of polymetallic tubes provides the answer to this problem since one can have a relatively inexpensive tube metal with a lining or outer casing, as the requirement may be, of a more corrosion-resistant metal.

In many applications it is necessary that the metallic layers comprising the composite tubes be bonded together by a continuous metallurgical bond, as opposed to a mechanical bonding or constrictive engagement of parts. The advantages accruing from metallurgical bonding are numerous. For example, the polymetallic body behaves more nearly as a unitary body, for example with respect to thermal expansion and mechanical working. Also, the stronger metallurgically bonded composite permits the use of thinner-walled tubes. The absence of unbonded pockets prevents gases which permeate one of the metals from accumulating between layers and weakening and perhaps collapsing the body. In addition, the continuous metallurgical bonding results in a more efficient conduction of heat from one layer to another.

The methods used heretofore for forming polymetallic composite tubes suffer from a number of disadvantages with respect to both the properties of the products formed and the difficulties of carrying out the processes. Often the products are simply mechanically bonded, i.e., the layers are held together by intimate engagement with one another; or have deleterious, brittle intermetallic phases in the bond zone. In many cases, special protective atmospheres, extensive preparation of the metal surfaces, and elaborate, expensive equipment are required in the processes.

This invention provides an explosion bonding process which is particularly adapted for bonding the walls of coaxially oriented tubular metal bodies. The process of this invention can be used for bonding tubular bodies of a wide variety of sizes with minimum distortion and without cumbersome and expensive layups and equipment, the products so provided having metallurgical bonding of high strength substantially throughout the wall area to be bonded. The improvement afforded by the process of this invention generally becomes more marked as the wall of the outer body is thicker and/or the wall of the inner body is thinner. Normally, the most marked improvement is obtained in cases in which the wall thickness of the inner body is about from 0.03 to 1 inch, especially up to 0.5 inch; the wall thickness of the outer body is about 0.03 inch or greater, especially about 0.1 inch or greater; and the ratio of the wall thickness to the outside diameter of the inner body is about 0.4 or less.

"Tubular metal bodies" as used herein means a cylindrical metal body substantially circular in cross-section, having a passage therethrough along its axis of rotation and includes elongated cylinders ranging from thin-walled tubes to thick-walled pipes as well as foreshortened cylinders such as thick-walled blanks similar in overall geometry to those used for tube extrusion.

The process of this invention comprises forming a layup comprising at least two, and usually two or three, tubular metal bodies coaxially positioned one within the other, the juxtaposed surfaces of said bodies being spaced apart from each other, a body of liquid disposed adjacent the inner surface of the innermost body to be bonded, and a layer of explosive having a detonation velocity of at least 1200 meters per second but less than 120% of the sonic velocity of the metal in the system having the highest sonic velocity adjacent the outer surface of the outermost metal body to be bonded, and initiating said explosive substantially simultaneously around its periphery at one longitudinal location, i.e., at a plurality of points located in one plane which passes through the explosive layer substantially normal to the coincident axes of the tubular bodies. Initiation of the explosive layer around the described periphery causes propagation of one or two (i.e., with initiation at the periphery at some plane intermediate the ends of the layup), oppositely directed, detonation fronts parallel to and encircling the tubes so that at any cross-sectional plane perpendicular to the axis of the tubular bodies the surfaces to be bonded collide substantially simultaneously. Collision of the tubular bodies results in a metallurgical bond therebetween which is substantially continuous, usually over 90% of the colliding surfaces being so bonded.

For a more complete understanding of the invention, reference is now made to the attached drawings wherein like numbers are used throughout to denote like elements, and wherein FIGURES 1 and 2 are cross-sectional views of assemblies which can be used to practice the present invention; and FIGURE 3 is a photomicrograph of the bond in an illustrative product obtained in accordance with this invention.

Referring now to the drawings in greater detail, in FIGURE 1, metal tube 1 is positioned coaxially inside metal tube 2 so as to provide a uniform spacing 3 between the convex surface of tube 1 and the concave surface of tube 2, i.e., these surfaces are parallel to one another. Spacing 3 is maintained by wrapping tape around the ends of tube 1, or by plugs uniformly located in the space near the ends of the tubes (spacing means not shown). A plug 4, for example one made of rubber, is inserted at one end of tube 1, the tube is filled with a liquid 5, e.g., water, and the tube is sealed at the opposite end by plug 6, e.g., one also made of rubber. The tube assembly is coaxially positioned as shown inside cylindrical container 7, made of heavy cardboard or plywood, for example, the assembly projecting through one end of the container and thereby maintained in coaxial position therewith. Container 7 is longer than the tube assembly. A detonating explosive composition 8 is packed into the annulus between the container wall and the convex surface of tube 2 to form a tubular explosive layer. The explosive is also packed into the space above the annulus and tube assembly. Initiation of explosive 8 is by means of blasting cap 9 having lead wires 10 leading to a source of electricity. Blasting cap 9 is wrapped in a layer of a cap-sensitive explosive composition 11 which is in contact with explosive 8. The cap assembly is maintained in coaxial position above the tube assembly by means of spacer element 12, made of cardboard or plywood, for example.

In the assembly shown in FIGURE 2, tube 1 contains liquid 5 as well as metal tube 13 positioned coaxially therein so as to provide a liquid annulus 14 between tube 1 and tube 13. Annular spacers 15 and 16, e.g., layers of tape, provide the spacing between tube 1 and tube 13. Annular spacer 17 provides the spacing between tube 1 and tube 2. The tube assembly is maintained in coaxial position in container 7 by means of an annular spacer 18, e.g., one made of cardboard or plywood, encircling one end of tube 1, plug 4 resting on the bottom of a closure member for container 7. Initiation of explosive 8 is by means of blasting cap 9 positioned at the center of a circular layer of a cap-sensitive explosive 19 extending over plug 6 with its edge curved toward the tube assembly to the extent that it abuts the portion of explosive 8 adjacent the nearest end of tube 2.

In the above-described assemblies, when electric current is supplied through lead wires 10, blasting cap 9 is actuated and initiates the surrounding explosive in a manner such that when the detonation front reaches the portion of the explosive layer 8 adjacent the nearest end of tube 2, the front arrives there simultaneously at a plurality of points along its periphery in a plane which passes through the explosive layer 8 substantially normal to the coincident axes of tube 1 and tube 2. As a result the entire periphery of tube 2 adjacent the front is subjected to substantially the same pressure, tube 2 being propelled progressively through space 3 so as to impact against the convex surface of tube 1, the tubes becoming metallurgically bonded thereby. Although massive solid supports are not employed, good bonding is achieved with negligible deformation of the tubes.

The process of this invention is applicable to tubular bodies of a wide variety of metals including, for example, aluminum, iron, titanium, columbium, chromium, tantalum, cobalt, nickel, zinc, vanadium, zirconium, molybdenum, silver, platinum, copper, gold, as well as alloys of a major proportion, e.g., 50% by weight or more, of one or more of the aforementioned metals with minor amounts of alloying elements. Metals having a specific gravity of at least 2, and preferably about from 2 to 17, particularly copper, nickel, iron, silver, titanium, zirconium, tantalum, and alloys of these metals are preferred. The alloys usually contain up to 50%, and preferably up to 30%, of alloying elements. In tantalum, titanium, and zirconium clads, usually the amount of alloying elements is minor, e.g., less than 15%. Preferably, the difference in specific gravity between the metals being bonded is no greater than 9. Of course, for practical purposes, the metals should be sufficiently ductile (e.g., percent elongation of greater than 5%) so that they do not crack or fracture during the bonding process. While the present process is employed to advantage in a wide variety of metal systems, it affords particularly improved products in the case of metal systems which form brittle intermetallic phases, e.g., titanium-steel, zirconium-steel, tantalum-steel, and titanium-aluminum, and thus are difficult to bond, e.g., by extrusion-diffusion techniques. The particular metal combination employed depends on the environment in which the product is to operate and, for example, on whether the outer or inner surface of the tube is to be exposed to corrosive or other severe conditions.

The liquid adjacent the inner surface of the inner tube can be any material inert toward the system and liquid at the operating conditions including inorganic liquids such as water and aqueous solutions, e.g., salt solutions, as well as organic liquids such as fuel and lubricating oils; aromatic hydrocarbons such as benzene, toluene and xylene; and mono- and polyhydric alcohols, e.g., glycols. Mixtures of such liquids also can be used, as well as emulsions and suspensions. Because of economics, water and aqueous solutions are preferred.

The body of liquid within the innermost tube serves not only to minimize distortion but, also, to prevent sticking which often results if a solid mandrel is used. Also, as contrasted with solid mandrels, the liquid employed in this invention will fit any size and length of tube. In addition, quite surprisingly, it appears that the liquid has a dynamic effect during the bonding process, quite unlike any effects obtained with solid mandrels.

In the process of this invention, detonation of the explosive drives the outer tube inward causing it to hit the inner tube and causing the liquid to be squeezed. When the detonation velocity of the explosive does not greatly exceed the speed of sound in the liquid, the inward motion of the tubes tends to squeeze the liquid ahead of the collision region, thus setting up a shock wave spanning the channel of the inner tube and moving substantially in an axial direction. As the collision region moves away from the initiation site, a steady flow configuration is set up quickly. This flow pattern can best be visualized in a steady-state coordinate system which moves along at the detonation velocity of the explosive. In the coordinate system, the undisturbed liquid flows into the shock front at the detonation velocity. Immediately behind the shock front the velocity of the liquid is subsonic. The pressure generated in the liquid causes the inner tube to be accelerated outward. The steady, expanding subsonic flow of the liquid causes the pressure to increase as the cross-sectional area increases. Eventually the outer tube, which is being driven inward by the detonation, collides with the expanding inner tube. The resulting composite tube moves inward at a reduced velocity. The pressure in the liquid in the region where the cross-sectional area is contracting decreases and the velocity increases toward the sonic value. As is well-known, there is a minimum cross-sectional area through which the liquid can flow, known as the critical throat area. At the throat, the flow velocity equals the sonic velocity; this is the critical velocity. Farther downstream the velocity can increase in the supersonic region. Since the cross-sectional area of the liquid cannot be decreased to less than the critical throat area, an increase in explosive load causes the shock to be driven farther ahead, thus causing a larger expansion of the inner tube at the moment of collision. On the other hand, a decrease in explosive load causes the shock to be farther back, thereby resulting in less expansion of the inner tube at the moment of collision. The transverse shock configuration will be maintained so long as the amount of explosive is sufficient to drive the tubes inward to the critical cross-sectional area.

Such a flow configuration is especially beneficial when the outer tube is thick-walled and the inner tube thin-walled. The advance shock in the liquid will produce a large outward-deflection angle of the inner tube at the point of collision. Since the collision angle (i.e., the angle between tubes upon impact) is the sum of the outward-deflection angle of the inner tube and the inward-deflection angle of the outer tube, the collision angle required for good bonding can be achieved with only a small angle of deflection of the outer tube, and consequently less explosive is needed. Also, since a large inward-deflection angle is difficult to achieve if the outer tube is quite thick relative to its diameter, bonding may be achieved in such cases with the present method owing to the large outward deflection angle of the inner tube.

As is shown in FIGURE 1, the liquid can fill the entire volume within the inner tube. Alternately, a metal tube or solid rod can be positioned coaxially therein and spaced from the inner surface of the inner tube so that a liquid annulus is formed between facing surfaces. In any case, the space in the inner tube should be filled, i.e., there should be no gases present therein. Therefore, in filling and sealing the tube, care should be taken that no air space remains therein. Except in cases in which the inner tube has considerable thickness or very small explosive loadings are used, the presence of gases in any significant amount inside the inner tube results in distortion thereof.

The use of a tube or rod within the inner tube as illustrated in FIGURE 2 is particularly advantageous in cases in which the wall of the inner tube to be bonded is extremely thin, or in which the outer tube wall is extremely thick requiring large explosive loadings. The feature of providing a metallic tube or solid rod inside the liquid-containing tube offers added insurance against deformation, and can be used in the extreme cases mentioned. While a liquid-filled tube without the additional tube or rod results in the formation of a tube composite with only very slight variations in diameter, the added tube or rod may be used for cases in which tolerance requirements in the product are very high and no further working of the product is contemplated.

The tube or rod placed inside the liquid-containing inner tube can be made of any metal, but preferably one which is not instantaneously shattered by the progressive force applied to the tube assembly. Steels are preferred. In order that uniform support be provided to substantially all of the inner tube, the support tube or rod therein preferably has substantially a uniform thickness (wall thickness of the tube), and is coaxial with the tubes to be clad. The thickness of the support tube or rod, and the thickness of the liquid annulus between said tube or rod and the inner surface of the inner tube to be bonded can vary. Generally, in cases where the inner support tube or rod is desired, the liquid annulus preferably ranges in thickness from about 0.05 to about one-third the inner diameter of the inner tube to be bonded. The support tube wall can be as thick as desired. A minimum support tube wall thickness of at least about 0.06 inch is preferred.

As previously indicated the explosive employed in this invention has a detonation velocity of at least 1200 meters per second but less than 120% of the sonic velocity of the metal in the system having the highest sonic velocity. Since the metals being bonded are in substantially parallel arrangement, the collision velocity is substantially equal to the detonation velocity. A collision or detonation velocity of less than the sonic velocities of the metals but more than 1700 meters per second is usually used. Within the aforementioned broad range, the particular velocity selected depends in large measure on the particular metal, in general, minimum velocities increasing as density decreases. Velocities within the range of 1900 to 2500 meters per second are particularly preferred because of the outstanding mechanical properties, including strength and doctility, of the products thus obtained.

The layer of explosive has a concave surface conforming to the convex surface of the outer of the metal tubes to be bonded, and positioned adjacent, i.e., in contact with or close proximity to, said convex surface at least throughout the area of said surface of the outer metal tube opposite the area of the concave surface thereof where bonding is to be accomplished. If desired, in order to minimize marring of the outer tube, a layer of masking tape or plastic film can be interposed between the outer tube and the adjacent layer of explosive. The configuration of the outer surface of the explosive layer can be as desired, e.g., the surface can form, in cross-section, a circle, square, or other uniform polygon. Preferably, the explosive loading (i.e., the quantity of explosive per unit of area of surface adjacent the outer metal tube) is substantially uniform. The loading to be used in any particular case will be selected on the basis of such factors as the thickness and density of the outer tube and the type of explosive used, thicker and denser-metal tubes requiring higher loadings of a given explosive. The layer of explosive can be made of any explosive having the required detonation velocity as used in the layup. For example, it can be a self-supporting sheet explosive, or it can be a granular composition maintained in a suitable container. Typical of such compositions are granular trinitrotoluene, nitroguanidine in low densities, and sensitized ammonium nitrate, e.g., various mixtures of ammonium nitrate and trinitrotoluene; the fibrous felt-like compositions described in U.S. Patent 3,102,833, such as PETN and RDX sheets; and low-velocity permissible explosives such as the explosives of the indicated velocity listed in the U.S. Bureau of Mines Information Circular 8087 (1962). The detonation velocity of the explosive layer should be constant throughout the layer. Therefore, when a granular explosive is used, the explosive should be packed down in the container to assure a uniform density and detonation velocity. Also, the detonation velocity of some explosives may vary with explosive layer thickness and geometry. Therefore, it is advantageous to know the detonation velocity of the explosive in the shape and size used.

The detonation front in the explosive adjacent the outer metal tube should be uniform, i.e., of uniform intensity, so that the tube is subjected to substantially the same pressure on its entire periphery. For this reason, initiation of the explosive layer is accomplished simultaneously at a plurality of points, usually at least 3, along the annular periphery thereof at one longitudinal location, as hereinbefore defined, preferably at one end. This can be effected in a number of ways. One way is to initiate the explosive layer by means of a line-wave generator, e.g., one of those described in U.S. Patent 2,943,571. The edge of the generator opposite the initiation point thereof (initiated, for example, by a blasting cap) can be wrapped around one end of the outer tube so that the edge forms a circle around the tube, the line-wave generator being in contact with the explosive layer. If desired, more than one line-wave generator can be used to form the circle. Furthermore, a symmetrical detonation front can be achieved by center-initiating a thin circular disc of a cap-sensitive sheet explosive, e.g., as in the assembly shown in FIGURE 2, the sheet being substantially normal to the axis of the tube assembly, the initiation point being in line with said axis, and the explosive layer, circular disc and tube assembly being so positioned that there is no explosive between the end of the tube assembly and the surface of the sheet facing and overlying it. Simple blasting cap initiation can be used by having the cap embedded in the same explosive used to form the explosive layer, as in FIGURE 1, in this case the explosive itself at the end of the assembly acting as a circular initiator. Alternatively, a number of caps can be used, or one cap connected to a plurality of points in the explosive layer by detonating cord; or the base of an inert cone can be placed at the end of the tube assembly, explosive packed around the cone, and the cone initiated at its apex by a blasting cap. Initiation at one longitudinal section, as hereinbefore defined, assures that the detonation front propagates progressively through the layer in a direction substantially parallel to the longitudinal axis of the tubes to be bonded, a condition necessary for bonding to occur. Preferably, when cap initiation is used, the cap is used to initiate a high-detonation-velocity explosive, which, in turn, initiates the explosive layer around the tube assembly.

The tubes to be bonded are coaxial with one another and uniformly spaced from one another by a distance of at least 0.001 inch, i.e., the surfaces to be bonded are parallel to one another. The particular spacing used depends on such factors as the thickness of the outer tube, the type of explosive, the explosive loading, the densities of the metals, the type of bond zone required (i.e., bond geometry and composition as described hereinafter), etc. For a given explosive loading and detonation velocity, low ratios of the spacing between tubes ($S_2$) to the wall thickness of the outer tube ($S_1$), e.g., ratios below about 0.5, tend to give less wave formation and high $S_2/S_1$ ratios, e.g., above about 1.5, give unusually large waves at the bond zone. Also, for a given system, if the $S_2/S_1$ ratio is held constant as the outer tube wall thickness is increased, the waves increase in size. If a wavy bond zone is desired, the $S_2/S_1$ ratio preferably should be increased as the difference in density between the tube metals increases. Usually the ratio of $S_2/S_1$ is within the range of 0.2 to 2.

The particular method used to maintain the spacing or standoff between tubes is not critical to the present invention. Layers of tape can be used between tubes at one or both ends of the tube assembly. When such layers are used at the end opposite the initiation end, longitudinal gaps or holes preferably are made in the layers to allow egress of air from the space between tubes as the tubes become progressively bonded. Stand off pieces such as wood, metal, or plastic rods or pins, or weldings or solderings also can be used. They preferably are spaced uniformly in the annulus between tubes at the end(s) of the tube assembly.

In order for continuous metallurgical bonding to occur, there is a minimum angle between the tubes at the point of impact during the bonding process which must be exceeded. Larger impact angles can be produced by increasing the initial standoff between tubes or using a larger explosive load. Although the minimum impact angle varies from metal to metal, generally it is in the range of 4° to 10° an angle of 10° being adequate in most systems. In any case, the precise minimum can be established by varying standoff and explosive load as just indicated. By way of example, for systems in which at least one tube consists essentially of titanium or nickel (i.e., the indicated metals alone or alloys thereof with minor amounts of alloying elements), the impact angle preferably is about from 7 to 20° and 4 to 18°, respectively. Also, in general, the explosive load increases with the mass per unit area and standoff of the outer tube and usually should be such that the outer tube has a velocity at collision of at least about 130 meters per second. Generally, with ratios of $S_2/S_1$ of 0.2 and 2 and a ratio of explosive load to outer tube weight of about from 0.5 to 30, impact angles above the required minimum, outer tube velocities of greater than 130 meters per second, and optimum bonding are obtained. Impact angle and tube velocity at impact can be determined by measurements on a semicylinder using a reflected grid-displacement technique such as that described by W. A. Allen and C. L. McCrary in Review of Scientific Instruments, vol. 24, pp. 165–171 (1953), making the corrections necessary for curved surfaces.

The dimensions of the tubes to be bonded can vary widely. There is no limit to the length of the tubes that can be bonded by the present process beyond practical handling limitations. With respect to tube wall thickness, the inner tube and outer tube preferably should be at least about 0.03-inch thick to assure optimum deformation resistance. While there is no upper limit on the wall thickness of the tubes, practical limits based on explosive loading, standoff, etc., requirements cause the process to be more applicable to outer tubes having a wall thickness of 1–2 inches or less. The distortion-reducing aspects of this invention become more particularly pronounced with inner tubes having a wall thickness of about from 0.03 to 1 inch, especially up to 0.5 inch; outer tubes having a wall thickness of about 0.03 or greater, especially about 0.1 inch or greater; and ratios of wall thickness to outside diameter of the inner tube of about 0.4 or less.

The multilayered tubular products obtained in accordance with this invention are continuously and metallurgically bonded substantially throughout, e.g., over greater than 90% of the area in which the tubes collide. The bond in the products as-bonded is substantially diffusionless, and the metal adjacent the bond shows ordered plastic deformation localized near the bond and in a direction substantially parallel to the bond interface and the axis of the tubes. The bond itself can take several forms. As shown in FIGURE 3, the bond can have a wavy form often with isolated regions of alloy 1 dispersed therein. This alloy is substantially uniform in composition, that is, not gradient, in the region in which it appears, its composition being between that of the bonded metals. Alternately, the bond can be substantially straight with a layer of the aforementioned alloy 1 between the bonded metals. In most cases, a bond with small waves, e.g., less than 1 millimeter in amplitude and length, and a minimum of alloy are preferred. In general, such preferred wavy bond is favored by low detonation velocities within the aforementioned preferred ranges and ratios of $S_2/S_1$ of about from 0.5 to 1.5.

The following examples serve to further illustrate specific embodiments of the present invention. In all cases any oxide or grease coating which may be present on the metal tube surfaces is removed by pickling or degreasing as the case may require.

The results are evaluated on the basis of metallographic study of the bond zone and strength tests. While the bond zone may vary in geometric configuration from substantially linear to wavy, bonding is regarded as satisfactroy if a continuous bond of uniform strength (regardless of configuration) is obtained with minimum tube deformation. However, a substantially symmetrical repetitive wavy bond zone is preferred because such a configuration provides greater strength.

*Example 1*

A rubber plug is fitted into one end of an 18-inch-long tube of Admirality brass having an outer diameter of 1.750 inches and an internal diameter of 1.450 inches (i.e., a wall thickness of 0.188 inch). The tube then is filled with water and sealed off with another rubber plug, care being taken to exclude air from inside the tube. An 18-inch-long tube of type 1015 low-carbon steel, in the stress-relieved condition, having an outer diameter of 2.625 inches and an internal diameter of 2.125 inches (i.e., a wall thickness of 0.250 inch) is placed coaxially inside a plywood box 18 inches long and of a square cross-section such as to provide a 5-inch spacing around the mild-steel tube, measured from the outer wall of the tube to the inner wall of the container on any line normal to the sides of the container and passing through the tube axis. The tube projects through holes in the box thereby maintaining the tube coaxial with the box.

The water-filled brass tube is positioned coaxially inside the mild steel tube so as to provide a spacing of 0.188 inch between the facing surfaces of the tubes, the spacing being maintained by three nylon pins inserted at each end of the double-tube assembly and positioned around the circular standoff at 120° intervals, the pins being 0.5 inch long and having a diameter of 0.188 inch. A 70/30 nitroguanidine/corn meal granular mixture is packed into the space between the plywood box wall and the outer tube to a density of 0.42 gram per cubic centimeter, the loading being such that the ratio of weight of explosive layer to outer tube weight is 4.4. Initiation of the explosive layer is by means of an electric blasting cap positioned at the center of a 3-inch-square layer of a high-velocity sheet explosive (U.S. Patent 2,999,743) positioned at one end of the assembly normal to the tube axis and extendnig into the granular explosive mixture surrounding the outer tube.

Actuation of the blasting cap and the consequent initiation of the layer of sheet explosive and the granular explosive cause a detonation front to arrive simultaneously at a plurality of points in substantially a circle in the explosive layer along the edge of the mild-steel tube, the detonation being propagated progressively in a direction parallel to the longitudinal axis of the tubes. The detonation velocity is about 2550 meters per second. After detonation, the tubes are found to be metallurgically bonded over substantially all of the interface between them exclusive of the end portions thereof, deformity is negligible, and the bond zone is in the form of small waves.

In the following examples, the detonation velocity can be decreased by increasing the amount of corn meal in the nitroguanidine/corn meal mixture, and increased by decreasing or eliminating the corn meal, or by using the sheet explosive compositions described in U.S. Patent 3,102,833, the disclosure of that patent being incorporated herein by reference. When the latter compositions are used, the container around the outer tube is not required. All detonation velocities are well below the sonic velocity of the metals. Sonic velocities of metals can be calculated as described in U.S. Patent 9,137,937. In all of the examples, the explosive loading is such that the ratio of the weight of the explosive mixture to the weight of the outer metal tube is in the range of 0.5 to 30; the optimum loading can be determined by taking a ratio near the limits of the range and, if discontinuities appear in the bond formed, increasnig or decreasing the ratio as required.

Example 2

A rubber plug is fitted into one end of a 12-inch-long type 316 stainless steel tube having an outer diameter of 1.500 inches and an internal diameter of 1.125 inches (i.e., a wall thickness of 0.187 inch). The tube then is filled with water and sealed off with another rubber plug, care being taken to exclude air from inside the tube. A 12-inch-long tube of 1018 mild steel, in the stress-relieved condition, having an outer diameter of 2.500 inches and an internal diameter of 2.000 inches (i.e., a wall thickness of 0.250 inch) is placed coaxially inside a heavy cardboard cylindrical container 14 inches long and of a diameter such as to provide a 1.312-inch annulus around the mild-steel tube. The tube projects through a hole in the bottom of the container, the hole having the same diameter as the outer diameter of the tube, and thereby is maintained coaxial with the container.

The water-filled stainless steel tube is positioned coaxially inside the mild-steel tube so as to provide a spacing of 0.250 inch between the facing surfaces of the tubes, the spacing being maintained by three rods inserted at each end of the double-tube assembly and positioned around the circular standoff at 120° intervals, the rods being one inch long and having a diameter of 0.250 inch. A line-wave generator of the type shown in FIGURE 2B of U.S. Patent 2,943,571 is wrapped around the top end of the mild-steel tube so that the edge of the generator forms a circle around the tube close to said end of the tube. An electric blasting cap is attached to the apex of the line-wave generator opposite the edge around the tube. The latter edge is in contact with a layer of explosive which surrounds the mild-steel tube throughout its length, the layer of explosive having a detonation velocity of about 3200 meters per second.

Actuation of the blasting cap and the consequent initiation of the line-wave generator cause a detonation front to arrive simultaneously at a plurality of points in substantially a circle at the edge of the generator opposite the initiation point, and the explosive layer around the mild-steel tube therefore is initiated simultaneously along said edge, the detonation being propagated progressively in a direction parallel to the longitudinal axis of the steel tubes. After detonation, the steel tubes are found to have bonded together firmly to form a bimetallic tube having negligible deformity. The outer diameter of the tube measured three inches from the end closest to initiation is 2.062 (maximum) and 2.052 (minimum); six inches from the same end, 2.130 (maximum) and 2.070 (minimum); and nine inches from the same end, 2.105 (maximum) and 2.075 (minimum). Metallographic examination reveals a continuous metallurgical bond between the stainless steel and mild steel tubes over substantially the entire interfacial area between the tubes exclusive of the ends.

When the experiment is repeated but with the omission of water from the inside of the stainless steel tube, there is substantial deformation of the composite, particularly the inner tube.

Examples 3–8

A number of stainless-steel-lined mild steel tubes are made by the general technique described in Example 2, with variations in such parameters as tube dimensions and spacing. The conditions employed are shown in Table I. In all of these examples, the detonation velocity is about 3200 meters per second except for Examples 3 and 4 in which the detonation velocity is about 2800 meters per second.

TABLE I

| Example No. | Mild Steel | | Stainless Steel | | Spacing Between Tubes ($S_2$) | $S_2/S_1$ | Length of Tubes |
|---|---|---|---|---|---|---|---|
| | Outer Diam. | Wall Thickness ($S_1$) | Outer Diam. | Wall Thickness | | | |
| 3 | 5.000 | 0.500 | 3.250 | 0.120 | 0.375 | 0.750 | 24 |
| 4 | 5.500 | 0.750 | 3.250 | 0.120 | 0.375 | 0.500 | 24 |
| 5 | 3.000 | 0.500 | 1.750 | 0.125 | 0.125 | 0.250 | 24 |
| 6 | 2.250 | 0.250 | 1.500 | 0.187 | 0.125 | 0.500 | 120 |
| 7 | 2.000 | 0.250 | 1.125 | 0.065 | 0.187 | 0.750 | 12 |
| 8a | 2.250 | 0.250 | 1.500 | 0.187 | 0.125 | 0.500 | 12 |
| 8b | 2.250 | 0.250 | 1.500 | 0.187 | 0.125 | 0.500 | 12 |
| 8c | 2.250 | 0.250 | 1.500 | 0.187 | 0.125 | 0.500 | 12 |

NOTE.—Dimensions in inches in all cases.

Good metallurgical bonding is achieved in all cases over substantially all of the interfacial area exclusive of the ends. In Example 8, good bonding is achieved with three different explosive loadings (loadings increasing consecutively from Example 8a to Example 8c), the bond zone being straight in Example 8a and wavy in Examples 8b and 8c. The amplitude and length of the waves in the clad product of Example 8c are greater than those in the product of Example 8b.

Example 9

The procedure described in Example 2 is used with variations in the method of initiating the layer of explosive. The stainless steel tube has a 1.750-inch outer diameter and a wall thickness of 0.120 inch; the ratio of the spacing between tubes to the wall thickness of the outer tube is 0.500; and the detonation velocity is about 2800 meters per second. In one case the means of initiation is an electric blasting cap embedded in a layer of a high-velocity sheet explosive placed at the apex of a paper cone affixed to the tube assembly so that the cone axis is coaxial with the tubes, the cone and cap assembly being embedded in granular explosive. In another case, the initiation assembly is that shown in FIGURE 1, and in still another case that shown in FIGURE 2. In all cases, excellent metallurgical bonding is achieved over substantially all of the interfacial area between the tubes exclusive of the ends.

Example 10

The procedure described in Example 2 is used with certain modifications to produce a mild-steel tube having a lining of titanium metallurgically bonded thereto. Both tubes used in the process are 18 inches long. The mild steel tube is made of type 1015 low-carbon steel in the stress-relieved condition and has an outer diameter of 2.500 inches and a wall thickness of 0.250 inch. The titanium conforms to specifications ASTM–B–338–T–61, Grade 2, the tube having a 1.500-inch outer diameter and a wall thickness of 0.120 inch. The spacing between metal tubes is 0.250 inch (ratio of spacing to outer tube thickness=1.000) and is maintained by a layer of tape around the end of the titanium tube nearest the initiation point. The explosive layer has a detonation velocity of 2420 meters per second and is initiated by actuation of an electric blasting cap in the center of a 50-mil-thick disc of a flexible explosive composition of U.S. Patent 2,999,743 detonating at a velocity of about 7200 meters per second. The initiator arrangement is that shown in FIGURE 2 except that the disc of sheet explosive is completely flat and extends to the walls of the container. Also, in this case, the coaxial spacing of the tube assembly in the cardboard cylinder is maintained as shown in FIGURE 2, using a cardboard spacing ring near the cardboard closure member for the cardboard cylinder. Another cardboard spacing ring is positioned around the steel tube about one inch below the initiator disc. The latter cardboard spacer has perforations in it to permit propagation of detonation from the explosive on one side of the spacer to that on the other side. After detonation of the explosive layer, a bimetallic tube composite is obtained wherein the two tubes have been metallurgically bonded together in the wavy bond pattern over substantially all of their interfacial area exclusive of the ends.

Repetition of the experiment with a mild steel tube of 2.750 inches outer diameter and 0.250 inch wall thickness, a spacing between metal tubes of 0.375 (ratio of spacing to outer tube thickness=1.500), and a 2⅓-inch thick layer of the same granular explosive produces substantially the same results, with a slight difference in the nature of the waves in the bond zone.

Example 11

The procedure of Example 10 is employed to produce a titanium-lined mild steel tube five feet in length. In this case the outer diameter and wall thickness of the steel tube are 2.313 inches and 0.219 inch, respectively; and of the titanium tube, 1.500 inches and 0.125 inch, respectively. The spacing between metal tubes is 0.188 inch (ratio of spacing to outer tube thickness=0.857), and the explosive detonates at 2400 meters per second. Excellent bonding is obtained over substantially all of the interfacial area between tubes, exclusive of the ends, the bond zone being characterized by small, symmetrical waves.

Example 12

A 61.5-inch-long titanium-lined mild-steel tube is made according to the procedure of Example 10 from a mild steel tube having a 2.625-inch outer diameter and a 0.250-inch wall thickness, and a titanium tube having a 1.625-inch outer diameter and a 0.125-inch wall thickness. The explosive layer detonates at 2400 meters per second. Excellent bonding is achieved.

In order to determine the behavior of the composite under conditions required to reduce its thickness, three-inch-long sections of the tubing taken from the end which has been nearest the initiation point are cut lengthwise into thirds, each section constituting 120° of the tube cross-section. These sections are heated at 1200° F. for 30 minutes and then flattened under approximately 40,000 p.s.i. The flattened pieces are then annealed at 1200° F. for one hour.

Following flattening and annealing, the longitudinal edges are machined off to leave flat rectangular billets, averaging 3″ x 0.875″ x 0.430″, which are then rolled on a laboratory roll mill at a speed of 40 feet per minute. The test pieces are reheated to test temperature after each pass through the rolls. The results, reported as the percent reduction in thickness, $t$ ($t_{start}-t_{finish}/t_{start}$), without the occurrence of failure are given in Table II.

TABLE II

| Rolling Temp. (° F.) | Change in Roll Opening per pass (in.) | Number of Passes | Thickness (in.) Start | Thickness (in.) Finish | Percent Reduction in Thickness |
|---|---|---|---|---|---|
| (¹) | 0.015 | 3 | 0.433 | 0.413 | 4.6 |
| 400 | 0.015 | 3 | 0.441 | 0.425 | 3.6 |
| 700 | 0.015 | 12 | 0.436 | 0.285 | 33.9 |
| 900 | 0.030 | 18 | 0.445 | 0.027 | >93.7 |

¹ Room temp.

Example 13

The procedure described in Example 2 is used to produce two titanium tubes, one lined with mild steel and the other with type 316 stainless steel metallurgically bonded thereto.

In both instances, the titanium tube is 0.125-inch thick and has an outer diameter of 2.500 inches, and the explosive has a detonation velocity of 2700 meters per second. In one case (A), the mild steel tube has a 2.000-inch outer diameter and a 0.250-inch wall thickness and the spacing between tubes is equal to the wall thickness of the outer tube. In the second case (B), the stainless steel tube has a 1.750-inch outer diameter and a 0.125-inch wall thickness and the spacing between tubes is twice the wall thickness of the outer tube. Good bonding is achieved in both cases, the wavy bond zone being somewhat more symmetrical in case B.

Examples 14–24

A number of bimetallic tubes are made by the procedure described in Example 2 under the specific conditions given in Table III. In Examples 14, 15, and 17 the means of initiation is the line-wave generator described in Example 2. In Examples 16 and 18–23 the sheet explosive disc initiator described in Example 10 is used. Good metallurgical bonding is achieved in every case with a wavy-type bond zone and over substantially all of the interfacial area exclusive of the tube ends. In the brass-mild steel system, smaller waves are produced with the smaller spacing between tubes used in Example 16 than are obtained in Examples 14 and 15.

TABLE III

| Example No. | Outside Tube Metal | Outside Tube Outer Diam. | Outside Tube Wall Thickness ($S_1$) | Inside Tube Metal | Inside Tube Outer Diam. | Inside Tube Wall Thickness | Spacing Between Tubes ($S_2$) | $S_2/S_1$ | Length of Tubes | Detonation Velocity (m./sec.) |
|---|---|---|---|---|---|---|---|---|---|---|
| 14 | Mild steel | 2.250 | 0.134 | Alpha brass | 1.750 | 0.148 | 0.116 | 0.866 | 12 | 2,600 |
| 15 | do | 2.250 | 0.218 | do | 1.500 | 0.065 | 0.156 | 0.716 | 12 | 3,110 |
| 16 | do | 2.125 | 0.120 | do | 1.750 | 0.148 | 0.062 | 0.517 | 25, 75 | 2,350 |
| 17 | 316 stainless steel | 1.900 | 0.140 | Nickel | 1.499 | 0.067 | 0.060 | 0.429 | 11 | 2,800 |
| 18 | Mild steel | 2.250 | 0.250 | Hastelloy C | 1.500 | 0.083 | 0.125 | 0.500 | 12 | 2,380 |
| 19 | Hastelloy C | 1.500 | 0.083 | Mild steel | 1.250 | 0.250 | 0.042 | 0.506 | 12 | 2,460 |
| 20 | Mild steel | 2.750 | 0.250 | Inconel 600 | 1.875 | 0.192 | 0.187 | 0.750 | 12 | 2,990 |
| 21 | Inconel 600 | 1.875 | 0.192 | Mild steel | 1.250 | 0.250 | 0.120 | 0.625 | 12 | 2,820 |
| 22 | Mild steel | 2.875 | 0.375 | Tantalum | 1.503 | 0.078 | 0.313 | 0.835 | 12 | 2,460 |
| 23 | do | 2.625 | 0.250 | Zircalloy-2 | 1.660 | 0.083 | 0.232 | 0.928 | 12 | 2,770 |
| 24 | do | 2.000 | 0.250 | Molybdenum | 1.000 | 0.097 | | | 12 | 2,600 |

NOTE.—Dimensions in inches in all cases.

Example 25

A three-layered tube of mild steel between two layers of type 316 stainless steel is made according to the procedure described in Example 2, having the inner tube of stainless steel filled with water, and the layer of explosive surrounding the outer tube of stainless steel. The outer stainless steel tube has an outer diameter of 2.750 inches and a wall thickness of 0.125 inch; the inner stainless steel tube has an outer diameter of 1.500 inches and a wall thickness of 0.187 inch; and the mild steel tube has an outer diameter of 2.250 inches and a wall thickness of 0.250 inch. The standoff distances between tubes are 0.125 inch in both cases; and the detonation velocity of the explosive is about 2800 meters per second. Excellent metallurgical bonding between both sets of tubes is achieved.

Example 26

An assembly such as that shown in FIGURE 2 is employed to produce a type 6061-T6 aluminum tube having a type 321 stainless steel lining metallurgically bonded thereto. The tubes to be bonded are 12 inches long. The aluminum tube has an outer diameter of 4.000 inches and a wall thickness of 0.125 inch; the stainless steel tube has an outer diameter of 3.500 inches and a wall thickness of 0.120 inch. Positioned axially within the stainless steel tube is a mild steel tube 10.25 inches long and having an outer diameter of 3.000 inches and a wall thickness of 0.250 inch. The latter tube is filled with water and there is a 0.130-inch water annulus between the mild steel tube and stainless steel tube. The spacing 3 is 0.125 inch. Spacers 15, 16, and 17, are layers of tape. The explosive layer 8 detonates at a velocity of 2720 meters per second. The initiation disc described in Example 10 is employed. Good bonding is achieved.

Examples 27-29

The procedure described in Example 1 is used to produce three bimetallic tubes under the conditions given in Table IV. In all three cases, excellent metallurgical bonding is achieved over substantially the entire interfacial area exclusive of the tube ends. Metallographic examination of the bond zone reveals the preferred uniformly wavy bond pattern with little or no alloy observable at a magnification of 250×.

I claim:
1. A process for metallurgically bonding at least two tubular metal bodies which comprises
   (a) forming a layup comprising said bodies to be bonded coaxially aligned one within the other, the juxtaposed surfaces of said bodies being spaced apart from each other, a body of liquid disposed within at least the innermost body and adjacent the inner surface thereof, said body of liquid being excluded from the space between the inner surface of the outermost body and the outer surface of the next innermost body, and a layer of explosive having a detonation velocity of at least 1200 meters per second but less than 120% of the sonic velocity of the metal in the system having the highest sonic velocity adjacent the outer surface of the outermost of said bodies to be bonded, and
   (b) initiating said explosive layer substantially simultaneously around its periphery at one longitudinal location.
2. A process of claim 1 wherein two tubular bodies are bonded and said explosive is a uniform layer of explosive having a detonation velocity of less than the sonic velocities of the metals being bonded.
3. A process of claim 2 wherein a cylindrical metal body is disposed in said liquid and spaced apart from the inner surface of the inner tubular body being bonded.
4. A process of claim 2 wherein said liquid is water.
5. A process of claim 4 wherein said explosive has a detonation velocity of about from 1900 to 2500 meters per second.
6. A process of claim 5 wherein the ratio of the space between said tubular bodies to the thickness of the outer body is about from 0.2 to 2, said tubular bodies have a specific gravity of about 2 to 17, the difference in specific gravity between said tubular bodies being no greater than 9, the weight ratio of explosive load to outer body is about from 0.5 to 30, the inner and outer tubular bodies have wall thicknesses of at least 0.03 inch, and the ratio of the wall thickness to the outside diameter of the inner body is a maximum of about 0.4.
7. A process of claim 6 wherein two tubular bodies are bonded, one consisting essentially of titanium and the other of steel.
8. A process of claim 6 wherein two tubular bodies are bonded, one of stainless steel and the other of steel.

TABLE IV

| Example No. | Outside Tube | | | Inside Tube | | | Spacing Between Tubes ($S_2$) | $S_2/S_1$ | Detonation Velocity (m./sec) |
|---|---|---|---|---|---|---|---|---|---|
| | Metal | Outer Diam. | Wall Thickness ($S_1$) | Metal | Outer Diam. | Wall Thickness | | | |
| 27 | 1015 mild steel | 2.500 | 0.250 | Admiralty brass | 1.750 | 0.148 | 0.125 | 0.500 | 2020 |
| 28 | ---do--- | 2.375 | 0.250 | Titanium [1] | 1.500 | 0.125 | 0.188 | 0.752 | 2020 |
| 29 | Type 304 stainless steel | 1.000 | 0.065 | 1015 mild steel | 0.690 | 0.065 | 0.090 | 1.385 | 2380 |

[1] ASTM-B-338-T-61, Grade 2.

Note.—Dimensions in inches in all cases.

References Cited
UNITED STATES PATENTS

| | | | |
|---|---|---|---|
| 3,036,374 | 5/1962 | Williams | 29—421 |
| 3,137,937 | 6/1964 | Cowan et al. | 29—486 |
| 3,140,537 | 7/1964 | Popoff | 29—474.3 |
| 3,141,236 | 7/1964 | Dunne et al. | 29—421 |
| 3,175,618 | 3/1965 | Lang et al. | 29—421 |
| 3,182,392 | 5/1965 | Neal et al. | 29—421 |

JOHN F. CAMPBELL, *Primary Examiner.*

P. M. COHEN, *Assistant Examiner.*